April 23, 1935.  J. GALAMB  1,998,614
AUTOMOBILE HOOD PAD CONSTRUCTION
Filed Dec. 22, 1928
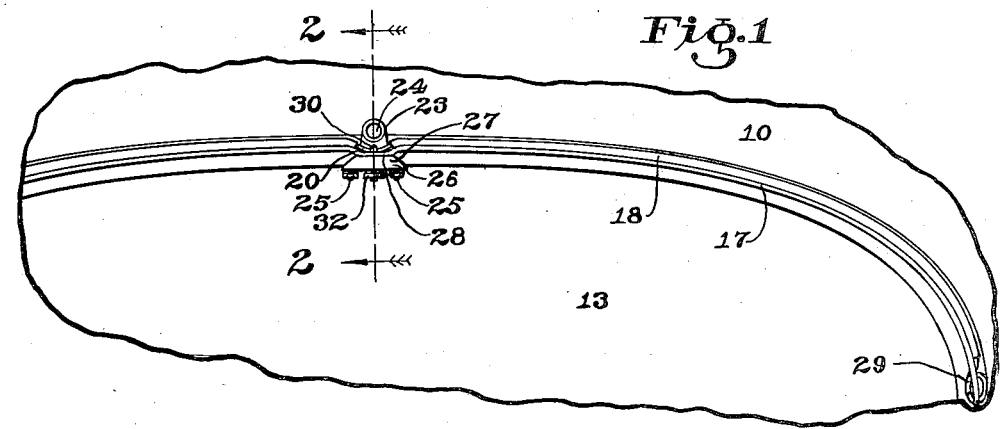
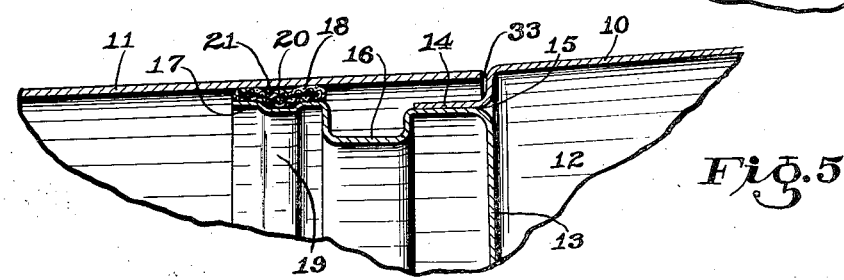
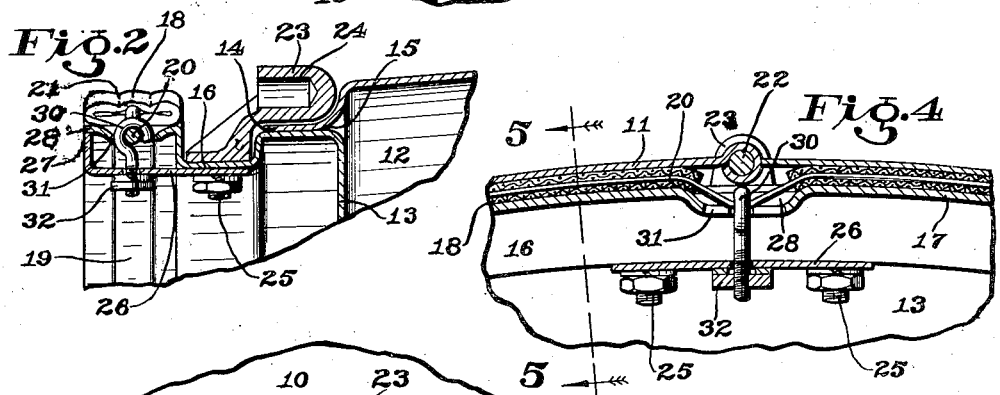
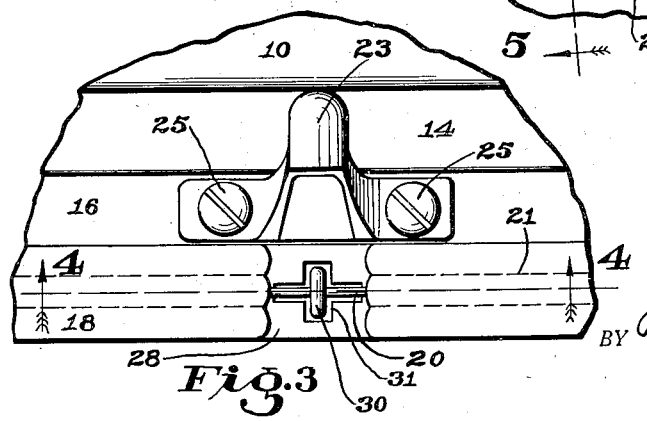
INVENTOR.
Joseph Galamb
BY C. R. Halbert,
E. L. Davis.
ATTORNEYS.

UNITED STATES PATENT OFFICE 1,998,614

AUTOMOBILE HOOD PAD CONSTRUCTION

Joseph Galamb, Detroit, Mich., assignor to Ford Motor Company, Fordson, Mich., a corporation of Delaware Application December 22, 1928, Serial No. 327,835

8 Claims. (Cl. 180—69)

The object of my invention is to provide an automobile hood pad construction of simple, durable and inexpensive construction.

A further object of my invention is to provide an automobile hood pad construction which may be mounted on the cowl of an automobile to insulate the hood used therewith from the cowl member.

Still a further object of my invention is to provide a hood pad construction which may prevent squeaks and rattles caused by the flexing of the hood and body members of an automobile.

Still a further object of my invention is to provide a hood pad construction consisting of a tubular fabric pad, reinforced by a wire center, having each end of said wire secured to the hood and means co-acting with the center of the wire for drawing the wire taut.

Still a further object of my invention is to provide a hood pad construction which will prevent water or other liquids, which may fall or be spilled on the hood and cowl members of an automobile, from entering the engine compartment. The old type hood lace construction, wherein the lace is woven in and out through a number of holes in the cowl flange offers no protection against such liquids entering the engine compartment between the hood and cowl members. It will be seen from the following specification that my improved automobile hood pad construction contacts with the hood and cowl members at practically all points along the top thereof to effectually seal the engine compartment and prevent the accidental entrance of any liquid therein.

Still a further object of my invention is to provide an automobile hood pad construction, in which the pad member may be fastened to the cowl of the automobile at only three points, namely, at each end thereof and at the top center of the cowl member, while at the same time securing the hood pad in intimate contact with the cowl member at all points along the top of said cowl member. It may be seen that if a strip of ordinary hood lacing or any non-reinforced fabric were riveted at only three points along the cowl member of an automobile, the wear and abuse to which such members are subject would probably tear the fabric strip loose from the cowl member and it would, therefore, cease to act as a pad for the hood. In my improved construction, I have secured the pad in intimate contact with the cowl at all points along the top thereof, in such a manner that the pad cannot become loosened from the cowl or in any way dislodged therefrom.

Still a further object of my invention is to provide adjustable means for placing the hood pad under tension whereby its position may be insured and compensation made for stretching due to use.

With these and other objects in view my invention consists in the arrangement, combination, and construction of the various parts of my improved device, as described in the specification, claimed in the claims and illustrated in the accompanying drawing, in which:

Figure 1 shows a front elevation of an automobile cowl and dash having my improved hood pad construction installed thereon.

Figure 2 shows an enlarged sectional view taken on the line 2—2 of Figure 1.

Figure 3 shows a top view of a portion of an automobile cowl with my improved hood pad construction installed thereon.

Figure 4 shows a sectional view taken on the line 4—4 of Figure 3 through the hood, hood pad and cowl of an automobile.

Figure 5 shows a sectional view taken on the line 5—5 of Figure 4.

Referring to the accompanying drawing, I have used the reference numeral 10 to indicate generally the cowl of an automobile having the hood 11 associated therewith. A gasoline tank 12 is formed in the cowl by uniting the edges of the dash 13 with the edges of the cowl 10. This type of gasoline tank, being of well known construction and forming no part of my invention will not be described further.

The cowl 10 has an offset flange 14 formed on the forward edge thereof, to which the dash 13 is secured by riveting or by seam welding as at 15. The seam weld 15 extends across the top and down the sides of the cowl 10 to the bottom of the gasoline tank. A channel 16 is formed adjacent to this weld 15 by extending forwardly the edge of the dash 13. A flange 17 is formed integral with the forward edge of the channel 16 and designed to form a hood pad retaining member 17. The hood pad retaining member 17 extends across the top and sides of the cowl 10 and forms a support for a hood pad proper, to which I have given the reference numeral 18. A longitudinal groove 19 is formed in the center of the hood pad retaining member 17.

The hood pad member 18 is formed from a tubular fabric strip which is flattened, as shown in Figure 5, and which has a center reinforcing wire 20 extended therethrough. The wire is held in the center of the strip by stitching seams 21 through the strip 18 on each side of the wire.

The rear end of the hood 11 rests on the hood pad 18 and a gap 33 is left between the cowl 10 and the rear end of the hood, as shown in Figure 5. This opening 33 is placed so as to prevent the finish of the cowl member from being marred by contact with the hood 11, as would occur if the hood bore directly against the cowl 10. To prevent liquids from entering the engine compartment through this gap the channel member 16 is formed below the gap 33. This channel 16 is of such size that it will collect and allow to run off down the sides of the cowl much more liquid than will normally enter through the relatively small gap 33.

A further protection against liquid accidentally entering the engine compartment is secured as the hood pad 18 is secured in intimate contact with both the hood and cowl members over practically the entire top and sides of the cowl. As may be seen, the hood pad 18 forms a gasket which prevents liquids, which may be running down the channel 16, from surging over the forward edge of the channel, due to the movement of the automobile, and entering the engine compartment.

The hood 11 is of the conventional type having a hinge in the top center part. A rod 22 forms the center hinge pin for the members of the hood 11 and is secured at its rear end to the cowl member 12 by a hinge rod bracket 23. The bracket 23 is secured in the channel member 16 at the center of the cowl member by screws 25 and extends rearwardly over the flange 14 to receive the hinge rod 22 in a suitable recess 24 in the upper end thereof. The bracket 23 is secured in the channel 16 so that the seam weld 15 will not be weakened by the bracket retaining screws 25.

An angular section clip 26 is also secured to the lower surface of channel 16 by the screws 25. The forward edge of this clip 26 projects upwardly as at 27 and contacts with the hood pad retaining member 17. The hood pad retaining member 17 is provided with a depression 28 in its central part and this depression has a cross shaped opening in the bottom thereof to receive a clamping hook which will be described later.

The reinforcing wire 20 is secured to the hood retaining member 17 at the extreme ends of the hood by inserting and securing the ends of the wire in holes 29, as shown in Figure 1, or by any other suitable means. The wire 20 and fabric 18 extend across the top of the cowl member, and the fabric is separated for a short distance near the center so that a hook member 30 may co-act with the clip 26 and the bared reinforcing wire 20 to draw the reinforcing wire 20 downwardly into the depression 28.

It will thus be seen that I have provided a reinforced hood pad which is secured to the sides of the cowl member of an automobile, and which may be drawn tightly against the cowl member by the hook 30. As is shown in the drawing, the reinforcing wire 20 is forced down into the groove 19 of the hood retaining member 17 and is thereby prevented from being displaced laterally out of the retaining member. The edges of the fabric hood pad are therefore so disposed that they form a pad or gasket between the hood 11 and the retaining member 17.

The depression 28 is provided with a cross shaped opening 31 in the bottom thereof through which the hook 30 extends. The longitudinal arms of this opening 31 prevent the hook 30 from turning when the nut used therewith is turned, and the transverse arms of the opening 31 allow the reinforcing wire 20 to be drawn down so as to tighten the pad member in the retaining member 17. A nut 32 is threaded onto the lower end of the hook 30 to draw the hook downwardly and to thereby draw the reinforcing wire down with it.

The method of installing my device on an automobile cowl is to secure the ends of the reinforcing wire 20 to the sides of the cowl at 29, insert the hook 30 through the clip 26 and over the wire 20 and then tighten the nut 32. An economical and permanent installation requiring very little labor is secured with my improved device and, as only the relatively inexpensive reinforcing wire hook and clip are not conventional, the cost thereof is very little.

Among the many advantages arising from the use of my improved device it may be well to point out that I have secured an automobile hood pad which is securely fastened to the cowl member of the automobile and which may at any time be adjusted to take up the slack which may occur therein. A further advantage results, in that I am enabled to insulate the engine compartment from the outside of the hood so that any liquid which may be spilled over the hood and cowl members cannot enter the engine compartment through the joint between the cowl and the hood.

Still a further advantage results in the fact that my improved device can be quickly and economically fastened to the cowl member of an automobile so that accidental displacement of the pad member will be impossible.

Still a further advantage results from the fact that the wire 20 is drawn into the groove 19 so that the pad forms a cushion for the hood of the full thickness of the pad whereby a relatively thick pad of large area is secured with a minimum amount of fabric.

Some changes may be made in the arrangement, construction and combination of my improved device, and it is my intention to cover by my claims such changes as may be included within the scope thereof.

I claim as my invention:

1. In a device of the character described, a cowl member having a hood support extending forwardly therefrom, a channel formed in said hood support, a wire reinforced hood pad having each end of said wire fastened to said hood support, and means disposed between the ends of said reinforcing wire for drawing the said wire into the said channel.

2. In a device of the character described, a cowl member, a metal reinforced hood pad having the reinforcing member securely fastened at each end to said cowl, and adjustable means associated with an intermediate portion of the reinforcing member for drawing said member taut.

3. In a device of the character described, a cowl member, a hood pad mounted on said cowl member, a hood pad reinforcing wire having each end secured to said cowl member, and a hook co-acting with an intermediate portion of said wire to operatively draw the wire taut.

4. In a device of the character described, a cowl member having a projection extending forwardly therefrom, a hood pad, a metal hood pad reinforcing member, means co-acting with an intermediate portion of said reinforcing member inducing tension therein, and means associated with said cowl projection for guiding said tension producing means independently of said reinforcing member.

5. In a device of the character described, a cowl member having a hood support extending forwardly therefrom, a hood pad mounted on said support, a metal hood pad reinforcing member, a hook co-acting with the center portion of said reinforcing member, a shank extending from said hook, and a cross shaped opening disposed in said hood support through which said shank extends, the horizontal arms of said opening restraining the hook from turning and the transverse arms of said opening allowing the reinforcing member to be drawn through said hood support.

6. In an automotive vehicle body, an engine hood ledge, a pad, a pad seat on said ledge deflected at intervals, and tension means at such intervals, designed to put tension on the pad and hold it in tight contact with said seat, and a pad fastening means at each end of said seat.

7. In an automotive vehicle body, an engine hood ledge, a pad, a pad seat formed on said ledge with a groove formed therein, pad fastening means at each end of the seat, tension means intermediate of said fastening means co-operating with said fastening means to hold a pad under tension against displacement on said seat.

8. In an automotive vehicle body, an engine hood ledge, a pad seat formed on said ledge, a pad, pad fastening means at each end of the seat, and tension means intermediate of said fastening means to place the pad under tension and co-operating with said fastening means to hold the pad against displacement on said ledge.

JOSEPH GALAMB.